(12) United States Patent
Arvanitis et al.

(10) Patent No.: US 8,932,529 B2
(45) Date of Patent: Jan. 13, 2015

(54) METHOD AND AN APPARATUS FOR PERFORMING AN ENERGY EFFICIENT DESULPHURIZATION AND DECARBONISATION OF A FLUE GAS

(71) Applicant: Siemens Aktiengesellschaft, München (DE)

(72) Inventors: Elena Arvanitis, Somerville, NJ (US); Manfred Baldauf, Erlangen (DE); Günter Schmid, Hemhofen (DE); Dan Taroata, Erlangen (DE); Frank Walachowicz, Berlin (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/176,343

(22) Filed: Feb. 10, 2014

(65) Prior Publication Data

US 2014/0154143 A1    Jun. 5, 2014

Related U.S. Application Data

(62) Division of application No. 13/448,645, filed on Apr. 17, 2012, now Pat. No. 8,728,425.

(51) Int. Cl.
*B01D 53/74*    (2006.01)
*B01D 53/81*    (2006.01)
*F01N 3/08*    (2006.01)
(Continued)

(52) U.S. Cl.
CPC ............ *F01N 3/0892* (2013.01); *B01D 53/501* (2013.01); *B01D 53/508* (2013.01); *B01D 53/62* (2013.01); *B01D 53/78* (2013.01); *B01D 53/83* (2013.01); *B01D 53/965* (2013.01); *F23B 90/04* (2013.01); *F23G 7/06* (2013.01); *B01D 53/50* (2013.01); *B01D 2251/302* (2013.01); *B01D 2251/402* (2013.01); *B01D 2252/103* (2013.01); *B01D 2252/2021* (2013.01); *B01D 2257/302* (2013.01); *B01D 2257/504* (2013.01); *B01D 2258/0283* (2013.01); *B01D 2259/128* (2013.01); *C02F 2103/18* (2013.01); *F23B 2900/00003* (2013.01); *Y02E 20/12* (2013.01); *Y02C 10/04* (2013.01)
USPC ........... 422/168; 422/169; 422/170; 422/187; 422/600; 422/608

(58) Field of Classification Search
USPC ................. 422/168, 169, 170, 187, 600, 608
See application file for complete search history.

(56) References Cited

U.S. PATENT DOCUMENTS 3,761,570 A * 9/1973 Lowicki et al. ............... 423/225
2005/0229783 A1* 10/2005 Alvarez et al. .................. 95/117
(Continued)

*Primary Examiner* — Timothy Vanoy

(57) ABSTRACT

A desulphurization and decarbonisation apparatus includes (a) a starter for starting a reaction between an electropositive metal and sulphur oxides and carbon dioxide of a flue gas; (b) a first reaction chamber with a cooling unit for reducing the sulphur oxides and the carbon dioxide of the flue gas in an exothermic reaction with the electropositive metal; (c) a second reaction chamber for generating a first suspension including suspended carbon containing reaction products and sulphur containing reaction products by extracting solid reaction products of the first reaction chamber in a solvent; (d) a third reaction chamber for oxidizing the first suspension to generate a second suspension including suspended carbon containing reaction products and oxidized sulphur containing reaction products; and (e) a separator for separating the oxidized sulphur containing reaction products from the suspended carbon containing reaction products.

8 Claims, 1 Drawing Sheet

(51) Int. Cl.
*B01D 53/50* (2006.01)
*B01D 53/62* (2006.01)
*B01D 53/78* (2006.01)
*B01D 53/83* (2006.01)
*B01D 53/96* (2006.01)
*F23B 90/04* (2011.01)
*F23G 7/06* (2006.01)
*C02F 103/18* (2006.01)

(56) References Cited

U.S. PATENT DOCUMENTS

| | | | |
|---|---|---|---|
| 2011/0305961 A1* | 12/2011 | Gladkov | 429/417 |
| 2012/0189529 A1* | 7/2012 | Wakimoto et al. | 423/432 |
| 2012/0291675 A1* | 11/2012 | Camire et al. | 106/801 |
| 2013/0178677 A1* | 7/2013 | Schmid et al. | 585/325 |
| 2013/0196271 A1* | 8/2013 | Schmid | 431/4 |

* cited by examiner

METHOD AND AN APPARATUS FOR PERFORMING AN ENERGY EFFICIENT DESULPHURIZATION AND DECARBONISATION OF A FLUE GAS

CROSS REFERENCE TO RELATED APPLICATIONS

This application is a divisional application of U.S. non-provisional application Ser. No. 13/448,645 filed Apr. 17, 2012, now U.S. Pat. No. 8,728,425, and claims the benefit thereof. The U.S. non-provisional application Ser. No. 13/448,645 is incorporated by reference herein in its entirety.

FIELD OF INVENTION

A method and an apparatus for performing an energy efficient combined desulphurization and decarbonisation of a flue gas comprising sulphur oxides and carbon dioxide are provided.

TECHNICAL BACKGROUND

Carbon-based fossil fuels provide a huge amount of energy, in particular electrical, thermal or mechanical energy. Along with power generation the fuel combustion generates various reaction products such as nitrogen oxides, carbon oxides and sulphur oxides. In the past, it was acceptable to allow flue gas discharge from electric utilities and industrial operations directly into the atmosphere without further treatment of the flue gas. However, with increasing evidence about environmental damage linked to, for example, the acidification of the atmosphere as a result of sulphur oxide emissions, and the risk of adverse climate change from global warming due to greenhouse gas emissions, flue gas treatment to mitigate emissions with pollution abatement techniques have become more important to comply to regulations and air quality standards. Current technologies for flue gas treatment involve resource and energy intensive processes.

SUMMARY OF THE INVENTION

Accordingly, there is a need for a method and apparatus which allows a combined energy efficient desulphurization and decarbonisation of flue gas.

A method for performing an energy efficient desulphurization and decarbonisation of a flue gas comprising sulphur oxides and carbon dioxide comprises the steps of:
(a) starting a reaction between an electropositive metal and the sulphur oxides and the carbon dioxide of said flue gas;
(b) reducing the sulphur oxides and the carbon dioxide of said flue gas simultaneously in an exothermic reaction with the electropositive metal and thereby generating reduced gaseous carbon products and solid reaction products while cooling;
(c) extracting the solid reaction products of the reducing step (b) in a solvent to generate a first suspension comprising suspended carbon containing reaction products and sulphur containing reaction products;
(d) oxidizing the first suspension obtained in extracting step (c) to generate a second suspension comprising suspended carbon containing reaction products and oxidized sulphur containing reaction products; and
(e) separating the oxidized sulphur containing reaction products from the suspended carbon containing reaction products.

Further, a desulphurization apparatus and/or process chain for use in said method is provided, said desulphurization apparatus comprising:
(a) at least one starter for starting a reaction between an electropositive metal and the sulphur oxides and the carbon dioxide of said flue gas;
(b) at least one reaction chamber (reactor, burner) having cooling means adapted to reduce the sulphur oxides and the carbon dioxide of said flue gas in an exothermic reaction with an electropositive metal;
(c) at least one reaction chamber adapted to generate a first suspension comprising suspended carbon containing reaction products and sulphur containing reaction products by selectively extracting (dissolving/precipitating) the solid reaction products of reaction chamber (b) in a solvent;
(d) at least one reaction chamber adapted to oxidize the first suspension to generate a second suspension comprising suspended carbon containing reaction products and oxidized sulphur containing reaction products; and
(e) at least one separator adapted to separate the oxidized sulphur containing reaction products from the suspended carbon containing reaction products.

In addition, a closed loop desulphurization apparatus for use in said method comprises:
(a) at least one starter for starting a reaction between an electropositive metal and the sulphur oxides and the carbon dioxide of said flue gas
(b) at least one reaction chamber (reactor, burner) having cooling means adapted to reduce the sulphur oxides and the carbon dioxide of said flue gas in an exothermic reaction with an electropositive metal;
(c) at least one reaction chamber adapted to generate a first suspension comprising suspended carbon containing reaction products and sulphur containing reaction products by extracting the solid reaction products of reaction chamber (b) in a solvent;
(d) at least one reaction chamber adapted to oxidize the first suspension to generate a second suspension comprising suspended carbon containing reaction products and oxidized sulphur containing reaction products;
(e) at least one separator adapted to separate the oxidized sulphur containing reaction products from the suspended carbon containing reaction products; and
(f) at least one regeneration unit adapted to regenerate the electropositive metal from the separated suspended carbon containing reaction products and/or from the separated oxidized sulphur containing reaction products.

Furthermore, a power plant or a steel plant or a blast furnace or a waste burning plant comprising said desulphurization system or said closed loop desulphurization system is provided.

BRIEF DESCRIPTION OF FIGURES

In the following, possible embodiments of the method and apparatus for performing an energy efficient desulphurization of a flue gas are described with reference to the enclosed figures.

Figure 1:
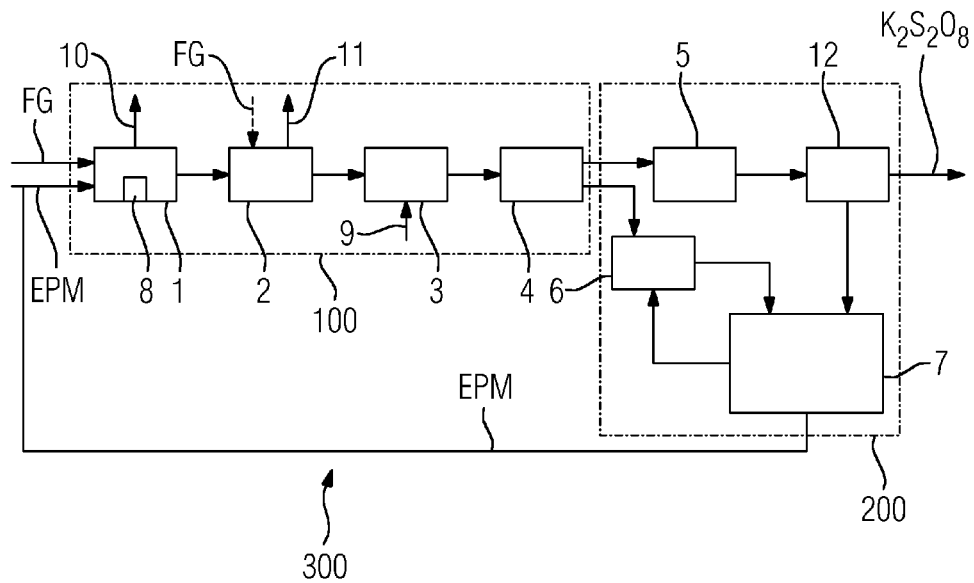
FIG. 1 shows a block diagram of a desulphurization and decarbonisation apparatus for energy efficient desulphurization of a flue gas comprising sulphur oxides and carbon dioxide according to an example of a possible embodiment.

In the figures, reference numerals denote the following components:
EPM electropositive metal
FG flue gas
1 reaction chamber for starting step (a) and reducing step (b)
2 reaction chamber for extracting step (c)
3 reaction chamber for oxidizing step (d)
4 separator for separating step (e)
5 anodic oxidation stage
6 conversion unit
7 electrolysis unit
8 burner with igniter
9 means for bubbling air or oxygen
10 exit (1) for gaseous product from reaction chamber (b)
11 exit (2) for gaseous product from reaction chamber (c)
12 precipitation stage
13 combined reactor for carrying out extracting step (c), oxidizing step (d) and separating step (e)
100 desulphurization and decarbonisation apparatus
200 regeneration unit
300 closed loop desulphurization and decarbonisation system Detailed Description of Embodiments Definitions An electropositive metal is a metal that is capable of donating electrons and usually forms positively charged ions. An electropositive metal is a metal, whose standard electrode potential with regard to the standard hydrogen electrode is less than −0.5 V, e.g. metals like zinc, magnesium, lithium.

The first suspension comprising suspended carbon containing reaction products and sulphur containing reaction products is a suspension wherein the solid products from reducing step (a) as well as some excess gases, e.g. carbon dioxide, are extracted with a solvent in extracting step (b).

Suspended carbon containing reaction products are products obtained in extracting step (c) in a method of an embodiment that contain carbon and are suspended in the solvent.

Sulphur containing reaction products are products obtained in extracting step (c) in a method of an embodiment that contain sulphur.

The second suspension comprising carbon containing reaction products and oxidized sulphur containing reaction products is a suspension wherein the first suspension has been oxidized, thereby generating oxidized sulphur containing reaction products. The carbon containing reaction products that are present in the first suspension, in contrast, are not further oxidized. The carbon containing reaction products comprised in the second suspension can be the same as the carbon containing reaction products in the first suspension or can be different.

Oxidizes sulphur containing reaction products are products obtained after oxidation of the sulphur containing reaction products in oxidizing step (d) in one embodiment which contain sulphur.

The extraction carried out in extracting step (c) can comprise a dissolving or suspending of the reaction products obtained in reducing step (b) as well as a reaction of these products with the solvent used in extracting step (c). Further, also a reaction of excess gas from reducing step (b) with the reaction products in the solvent is possible.

An igniter is a source for starting the exothermic reaction between an electropositive metal and the sulphur oxides and the carbon dioxide of said flue gas and can include an igniter, an ignition set, a spark plug, etc.

A separator is a separation unit used to separate oxidized sulphur containing reaction products from suspended carbon containing reaction products.

In one embodiment, a method for performing an energy efficient desulphurization and decarbonisation of a flue gas comprising sulphur oxides and carbon dioxide is provided, comprising the steps of:
(a) starting a reaction between an electropositive metal and the sulphur oxides and the carbon dioxide of said flue gas;
(b) reducing the sulphur oxides and the carbon dioxide of said flue gas simultaneously in an exothermic reaction with the electropositive metal (EPM) and thereby generating reduced gaseous carbon products and solid reaction products while cooling;
(c) extracting the solid reaction products of the reducing step (b) in a solvent to generate a first suspension comprising suspended carbon containing reaction products (CCRPs) and sulphur containing reaction products (SCRPs);
(d) oxidizing the first suspension obtained in extracting step (c) to generate a second suspension comprising suspended carbon containing reaction products and oxidized sulphur containing reaction products (OSCRPs); and
(e) separating the oxidized sulphur containing reaction products from the suspended carbon containing reaction products.

In certain embodiments, the EPM supplied in starting step (a) and/or reducing step (b) can comprise at least one element of the first, second or third periodic group within the periodic table or zinc. The EPM can in one embodiment comprise at least one metal selected from lithium, sodium, potassium, magnesium, calcium, strontium, barium, aluminum, zinc, or alloys thereof. In a preferred embodiment, the EPC comprises at least one metal selected from lithium, magnesium, zinc and alloys thereof. In a further preferred embodiment the EPM comprises lithium. When lithium is comprised as EPM, the separation of the CCRPs and OSCRPs is facilitated. In certain embodiments, also combinations of two or more EPMs can be used.

In certain embodiments, the EPM is added continuously to reducing step (b) after the reaction between the EPM and the sulphur oxides and the carbon dioxide of said flue gas were started in reaction starting step (a). Furthermore, in certain embodiments, the solid reaction products are continuously removed from reducing step (b). However, it is also provided that the addition of the EPM and the removal of the solid reaction products is carried out batchwise or semi-continuous.

In certain embodiments, nitrogen oxides that may be present in the flue gas have been separated from the flue gas before introducing it into reducing step (b). This ensures that no further reaction products are formed in reducing step (b) which could influence the separation of the CCRP and OSCRP in separating step (e). However, it is not excluded in the method that nitrogen oxides or other low volume by-products, e.g. hydrogen halogenides, water, are comprised in the flue gas, in particular if the reaction products of the EPM with the nitrogen oxides or other low volume by-products, e.g. hydrogen halogenides, can easily be separated from the CCRPs and CSRPs and/or the OSCRPs.

In certain embodiments, the starting step (a) involves starting the reaction between the electropositive metal and the sulphur oxides and carbon dioxide at a temperature from 200 to 900° C., preferably 400 to 900° C. The reaction can thereby for example be started with an igniter, an ignition set or a spark plug, etc., which serves as starter for starting the reaction in starting step (a).

In certain embodiments, the electropositive metal can be provided in solid or liquid form to the starting step (a) and/or reducing step (b). In preferred embodiments, the electropositive metal is provided in liquid form.

In some embodiments, the electropositive metal can be sprayed into the at least one reaction chamber (b) from an exit of a burner or a nozzle and then get ignited with an igniter in starting step (a). In some embodiments, the starting is carried out near the place where the electropositive metal is added/injected). The electropositive metal can, in certain embodiments, be preheated before introducing it into the at least one reaction chamber (b). In certain embodiments, this preheating is carried out with the thermal energy produced in reducing step (b).

In one embodiment, a temperature during the reduction in reducing step (b) is between 500 and 4000° C., preferably between 1500 and 3000° C. Preferably, the temperature produced in the exothermic reaction during the reduction in reducing step (b) is sufficient that it can be used for producing electrical energy by means of energy conversion. In certain embodiments, the energy conversion can be carried out by heating the cooling means in the at least one reaction chamber (b).

In certain embodiments, thermal energy is provided by the exothermic reaction with said electropositive metal in step (b). This thermal energy can be used to power a generator being adapted to produce electricity. For example, the thermal energy can be used in a heat exchanger that in return can power a turbine. In other embodiments, the thermal energy can be used to provide energy (e.g. thermal energy) to a gaseous product obtained in reducing step (b) or otherwise present in the flue gas which then can be used to produce electrical energy, for example in a gas turbine.

In some embodiments, the thermal energy produced in the reduction in reducing step (b) is used to evaporate a cooling liquid, e.g. water, in a heat exchanger and/or a cooling coil to produce steam. This steam then can be used in e.g. a turbine to produce electrical energy.

In certain embodiments, cooling is also carried out by other means in the at least one reaction chamber (b), e.g. by preheating the electropositive metal provided for starting step (a) and/or reducing step (b), or by interaction with the walls of the at least one reaction chamber (b).

Preferably, cooling is carried out to a temperature where the introduction of the solid reaction products generated in reducing step (b) in extracting step (c) does not lead to an evaporation of the solvent used for extracting these solid reaction products to generate a first suspension comprising suspended carbon containing reaction products and sulphur containing reaction products. In certain embodiments, the cooling is carried out to a temperature at or below the boiling point of this solvent at a certain pressure of the process used in extracting step (c).

In a certain embodiment, the exothermic reaction in the reducing step (b) is started using the igniter of a burner. However, the starting of the reaction can also be carried out using other heat sources. The use of a burner with an igniter is preferred as it can easily provide enough energy to start the exothermic reaction. Examples of suitable burners include, but are not limited to oil burners, gas burners, etc.

The at least one starter, e.g. a burner with an igniter (hereinafter also referred to sometimes as "burner"), for starting the reaction can be operated at a suitable temperature for starting the reaction of the EPM with the carbon oxides and sulphur oxides contained in the flue gas, e.g. at a temperature between 200 and 900° C., preferably 400 and 900° C. In an exemplary embodiment, the burner can then be operated in reducing step (b) at a temperature between 500 and 4000° C., preferably at a temperature between 1500 and 3000° C. In certain embodiments, the burning temperature can be controlled in the process. The burning temperature depends on the reaction conditions, e.g. the content of carbon dioxide and/or sulphur oxides in the flue gas, further components in the flue gas, the amount of supplied electropositive metal, the cooling means, etc.

In certain embodiments, the burner is operated continuous, semi-continuous or batchwise in reducing step (b), i.e. the electropositive metal is added continuously, semi-continuously or batchwise to reducing step (b). A continuous addition of the electropositive metal is preferred.

During the reducing step (b), reduced gaseous carbon products, such as carbon monoxide, are formed from the reaction of the EPM with carbon dioxide. This gaseous product then can in one embodiment be separated from the further solid products that form by the reducing reaction of the EPM, the carbon dioxide and the sulphur oxides, such as sulfides, sulfites, oxides, carbonates, carbides, which form as solids. In certain embodiments, generated carbon monoxide CO can be used as a basis for producing $C_1$-materials, such as methanol, syngas, formic acid, etc.

These solids are in certain embodiments cooled when they exit the reaction zone in reducing step (b) and before they are extracted in extracting step (c). This cooling can occur at a wall of a reaction chamber used in reducing step (b) or at the burner used in one embodiment of reducing step (b) as well as at the further cooling means. In some embodiments, however, an additional cooling step (b') is carried out before extracting the solid reaction products of reducing step (b) in extracting step (c). Preferably, the reaction products of reducing step (b) are cooled to a temperature below the boiling point at the pressure of the process of the solvent used in extracting step (c) so that no gaseous solvent is produced in extracting step (c).

In the extracting step (c), a first suspension is generated comprising CCRPs and SCRPs in a solvent. Suitable solvents that can be used in extracting step (c) in embodiments are solvents which can extract the reaction products produced in reducing step (b). In preferable embodiments, the solvent is selected from water and methanol. In particular preferred embodiments, the solvent is water. During the extracting step (c), the solvent can suspend or dissolve the reaction products of reducing step (b) or react with these reaction products. Therefore, also other products can be formed in the first suspension generated in extracting step (c) besides the CCRPs and the SCRPs. In certain embodiments, carbides which are formed can react with the solvent to form acetylene from electropositive metal carbide.

This acetylene then can be separated from the suspension generated in extracting step (c) as a gaseous product and, for example, be used as a starting material for various fine chemicals such as, but not limited to, 1,4-butanediol and vinyl acetate monomer.

In certain embodiments, also a further gas or liquid can be supplied in extracting step (c) so that during the extraction further products aside from the CCRPs and SCRPs can be converted to CCRPs and/or SCRPs. If a further gas is supplied and also acetylene is formed in certain embodiments, the addition of the further gas has to be carried out separate from the separation of the acetylene. Preferably the gas is added after acetylene is separated. In certain embodiments, the further gas can be carbon dioxide or carbon dioxide with $SO_x$. In some embodiments, flue gas or carbon dioxide can be added in extracting step (c) to form further CCRPs and/or SCRPs. Also salt solutions of the EPM can be added. Further, also excess gas from reducing step (b) can in some embodiments be carried over to extracting step (c) and can be dissolved in the solvent. This dissolved gas then can also react with the suspended or dissolved solid particles from reducing step (b) and/or generated in extracting step (c) through reaction with the solvent to produce CCRPs and SCRPs. For example, a product formed by the reaction of an electropositive metal carbide with the solvent can be reacted to a carbonate with excess carbon dioxide that is carried over from the reducing step (b).

In certain embodiments, excess gas from reducing step (b) is also carried over to extracting step (c) to control the pH in the solvent in extracting step (c). This can then ensure also that the CCRPs and SCRPs can be separated in extracting step (c) and/or oxidizing step (d) and/or separating step (e).

In certain embodiments, the first suspension generated in extracting step (c) comprising CCRPs and SCRPs is oxidized in oxidizing step (d) to generate a second suspension comprising CCRPs and OSCRPs. The oxidation in the oxidizing step (d) can be carried out using known oxidizing agents, such as oxygen or chlorine. In preferred embodiments, oxygen is used in the oxidizing step for the oxidation. This oxygen can be provided by bubbling air or pure oxygen through the suspension. It is also possible to spray the suspension in air or oxygen. Preferably, the bubbling is carried out from the bottom of the suspension. In certain embodiments, the SCRPs are oxidized to a sulfate salt of the EPM.

The CCRPs are then, after the oxidizing step (d), separated in separating step (e) from the OSCRPs in certain embodiments. In certain embodiments, the OSCRPs are essentially all dissolved in the solvent after oxidizing step (d) in separating step (e), and the CCRPs are essentially all precipitated after said step (d). Preferably the OSCRPs are all in solution after the oxidizing step (d) and the CCRPs are all precipitated after the oxidizing step (d). In certain embodiments, the CCRPs are precipitated as carbonates of the electropositive metal. In certain embodiments, the OSCRPs are essentially present as dissolved sulfate salt of the EPM. Preferably the OSCRPs are all present as dissolved sulfate salt of the EPM. In certain embodiments, the OSCRPs can thus be separated from the OCCRPs by way of solid-liquid separation. Generally, this separation is carried out with low energy consumption. In certain embodiments, the energy obtained from the exothermic reaction in reducing step (b) can be used for the separating in separating step (e). In certain embodiments, the energy obtained from the exothermic reaction in reducing step (b) can also be used for providing energy to pumps and other equipment, e.g. the regeneration units, of the apparatus and/or closed loop apparatus. Pumps can be used in certain embodiments to pump the suspensions or solutions produced in the present method as well as liquid electropositive metal.

In certain embodiments, the suspended carbon containing reaction products can already be at least partially separated from the suspension in extracting step (c) and/or oxidizing step (d). It is also possible that all the suspended carbon containing reaction products are separated in extracting step (c) and/or oxidizing step (d), so that in some embodiments the separating step (e) takes place before or during the oxidizing step (d).

In certain embodiments, the OSCRPs are converted to a not readily soluble form, e.g. salt, for a subsequent regeneration of the electropositive metal. In certain embodiments, the not readily soluble form is of certain value and can be further processed. In certain embodiments, the dissolved OSCRPs undergo an anodic oxidation after the separation in separating step (e) to produce a peroxodisulfate salt of the EPM. If the peroxodisulfate salt of the EPM is soluble in the solvent, the peroxodisulfate anions can in certain embodiments be precipitated by adding excess potassium chloride and/or ammonium chloride to form potassium peroxodisulfate and/or ammonium peroxodisulfate as a precipitate and a mixture of electropositive metal chloride salt and potassium chloride and/or ammonium chloride dissolved in the solvent. The electropositive metal chloride salt and potassium chloride and or ammonium chloride can in some embodiments than be obtained as solid product by evaporating the solvent. This evaporation can in certain embodiments be carried out using the excess thermal energy or the produced energy produced in the present method, e.g. in reducing step (b) or the separation step (c). In certain embodiments, also energy is obtained by the reaction of the solid reaction products of reducing step (b) with the solvent in extracting step (c). In certain embodiments, also this energy can be used in the present method for energy-consuming steps, e.g. the evaporation for obtaining electropositive metal chloride salt and potassium chloride and or ammonium chloride, the electrolysis in the at least one regeneration unit, i.e. the electrochemical regeneration of the electropositive metal, or pumps.

The produced potassium peroxodisulfate can then be used as a bleaching and/or etching agent. In certain embodiments, further the formed electropositive metal chloride and potassium chloride and/or ammonium chloride can, after separation from the potassium peroxodisulfate, undergo a Down's process for the electrochemical regeneration of the electropositive metal. In this process, electrical energy from renewable power sources can be used in some embodiments for the regeneration of the electropositive metal.

In certain embodiments, the EPM can be regenerated from the carbon containing reaction products and/or the oxidized sulphur containing reaction products. In such processes, electrical energy from renewable power sources can be used in some embodiments for the regeneration of the electropositive metal. In preferred embodiments, the EPM is regenerated from an electropositive metal carbonate of the CCRPs. In further preferred embodiments, the electropositive metal carbonate is converted by means of aqueous hydrochloric acid into electropositive metal chloride which is converted by electrolysis into electropositive metal forming the electropositive metal used in the exothermic reaction with the flue gas. The chloride generated during the electrolysis can then be reused for generating the aqueous hydrochloric acid. Also, carbon dioxide produced by the reaction of the carbonate with aqueous hydrochloric acid can be reused or stored. In a possible embodiment the electropositive metal EPM can be regenerated from reaction products in a closed loop.

After the regeneration of the EPM after the Down's process after the precipitation of peroxodisulfate anions and/or after the regeneration from the CCRPs and/or the OSCRPs, the regenerated EPM can in some embodiments be reused in the method. For this purpose, the regenerated EPM can in some embodiments be recycled to the starting step (a) and/or reducing step (b). In preferred embodiments, the EPM is recycled to reducing step (b) when the EPM is added continuously to reducing step (b). In some embodiments, the regenerated EPM can be transported for exothermic reaction with the flue gas in reducing step (b) as a metal in solid form or liquid form or as a hydride in solid form.

Further, a desulphurization and decarbonisation apparatus for use in said method, is provided, said desulphurization and decarbonisation apparatus comprising:

(a) at least one starter for starting a reaction between an electropositive metal and the sulphur oxides and the carbon dioxide of said flue gas;

(b) at least one reaction chamber having cooling means adapted to reduce the sulphur oxides and the carbon dioxide of said flue gas in an exothermic reaction with an electropositive metal;
(c) at least one reaction chamber adapted to generate a first suspension comprising suspended carbon containing reaction products and sulphur containing reaction products by extracting the solid reaction products of reaction chamber (b) in a solvent;
(d) at least one reaction chamber adapted to oxidize the first suspension to generate a second suspension comprising suspended carbon containing reaction products and oxidized sulphur containing reaction products; and
(e) a separator adapted to separate the oxidized sulphur containing reaction products from the carbon containing reaction products.

In certain embodiments, the at least one starter is provided inside the reaction chamber (b).

In certain embodiment the reaction chamber (b) can comprise a burner with an igniter or ignition set or spark plug, etc. With this igniter, the exothermic reaction in reducing step (b) can be started in some embodiments in the desulphurization and decarbonisation apparatus, e.g. in a burning chamber, a burning tower or a firing tower used as reaction chamber (b).

In certain embodiments, the reaction chamber (b) in the desulphurization and decarbonisation apparatus can comprise a burner for the exothermic reaction in the method. This burner is in some embodiments used to inject the electropositive metal into reaction chamber (b).

In certain embodiments, the reaction chamber (c) and/or the reaction chamber (d) and/or the separation unit (e) is a stirred reactor or a fluidized bed reactor.

In certain embodiments, reaction chamber (c) and/or reaction chamber (d) can also comprise a separator for separating at least a part of the suspended carbon containing reaction products. Examples of suitable separators that can be used as those separators as well as separator (e) include, but are not limited to filters, centrifuges, sedimentation tanks and other separation means for solid-liquid separating known to the skilled person.

In certain embodiments, the reaction chamber (d) comprises a means for bubbling air or oxygen. In certain embodiments, the reaction chamber (d) comprises means for spraying the first suspension into air or an oxygen atmosphere. In certain embodiments, the reaction chamber (d) comprises an exit for gas after bubbling or spraying.

In certain embodiments, the reaction chamber (b) and/or the reaction chamber (c) comprise an exit for gaseous products such as carbon monoxide or acetylene.

In certain embodiments, the reaction chamber (c) and the reaction chamber (d) or the reaction chamber (c), the reaction chamber (d) and the separator (e) can be combined in one unit, e.g. one vessel, plant, stirrer, tank, caldera, kettle, pot or boiler. This means that the extracting step (c) and the oxidizing step (d) or the extracting step (c), the oxidizing step (d) and the separating step (e) of the method can be carried out in one unit. Also the reaction chamber (c) can be combined with the separator (e) and the reaction chamber (d) be separate, and it is also possible that reaction chamber (c) is separate and reaction chamber (d) is combined with separator (e). Preferably, the extracting step (c), the oxidizing step (d) and the separating step (e) of the method can be carried out in one unit, thus saving equipment cost as well as maintenance cost. Further, by combining the three process steps, also reagent amounts can be reduced, e.g. the solvent.

In certain embodiments, the desulphurization and decarbonisation apparatus and/or a plant comprising said apparatus can further comprise an anodic oxidation stage/unit to produce a peroxodisulfate salt from the dissolved OSCRPs provided by said separation unit. In preferred embodiments, the peroxodisulfate salt is precipitated in or after this stage for separation.

In certain embodiments, the desulphurization and decarbonisation apparatus can further comprise first regenerating means adapted to regenerate the EPM from the separated CCRPs and/or second regenerating means adapted to regenerate the EPM from the separated OSCRPs.

In certain embodiments, the desulphurization and decarbonisation apparatus can comprise means for recycling the regenerated EPM.

In addition, a closed loop desulphurization and decarbonisation apparatus for use in said method is provided, comprising:
(a) at least one starter for starting a reaction between an electropositive metal and the sulphur oxides and the carbon dioxide of said flue gas;
(b) at least one reaction chamber having cooling means adapted to reduce the sulphur oxides and the carbon dioxide of said flue gas in an exothermic reaction with an electropositive metal;
(c) at least one reaction chamber adapted to generate a first suspension comprising suspended carbon containing reaction products and sulphur containing reaction products by extracting the solid reaction products of reaction chamber (a) in a solvent;
(d) at least one reaction chamber adapted to oxidize the first suspension to generate a second suspension comprising suspended carbon containing reaction products and oxidized sulphur containing reaction products;
(e) at least one separator adapted to separate the oxidized sulphur containing reaction products from the suspended carbon containing reaction products; and
(f) at least one regeneration unit adapted to regenerate the electropositive metal from the separated carbon containing reaction products and/or from the separated oxidized sulphur containing reaction products.

In certain embodiments, the at least one starter is provided inside the reaction chamber (b).

In certain embodiments the reaction chamber (b) can comprise a burner with an igniter or ignition set or spark plug. With this igniter, the exothermic reaction in reducing step (b) can be started in some embodiments in the desulphurization and decarbonisation apparatus, e.g. in a burning chamber, a burning tower or a firing tower used as reaction chamber (b).

In certain embodiments, the reaction chamber (b) in the closed loop desulphurization and decarbonisation apparatus can comprise a burner for the exothermic reaction in the method. This burner is in some embodiments used to inject the electropositive metal into reaction chamber (b).

In certain embodiments, the reaction chamber (c) and/or the reaction chamber (d) and/or the separator (e) is a stirred reactor or a fluidized bed reactor.

In certain embodiments, the reaction chamber (d) in the closed loop desulphurization and decarbonisation apparatus can comprise a means for bubbling air or oxygen. In certain embodiments, the reaction chamber (d) comprises means for spraying the first suspension into air or an oxygen atmosphere. In certain embodiments, the reaction chamber (d) comprises an exit for gas after bubbling or spraying.

In certain embodiments, the reaction chamber (b) and/or the reaction chamber (c) in the closed loop desulphurization and decarbonisation apparatus further comprise an exit for gaseous products such as carbon monoxide or acetylene.

In certain embodiments, the reaction chamber (c) and the reaction chamber (d) in the closed loop desulphurization and decarbonisation apparatus or the reaction chamber (c), the reaction chamber (d) and the separation unit (e) in the closed loop desulphurization and decarbonisation apparatus are combined in one unit. This means that the extracting step (c) and the oxidizing step (d) or the extracting step (c), the oxidizing step (d) and the separating step (e) of the method can be carried out in one vessel. Also the reaction chamber (c) can be combined with the separator (e) and the reaction chamber (d) be separate, and it is also possible that reaction chamber (c) is separate and reaction chamber (d) is combined with separator (e). Preferably, the extracting step (c), the oxidizing step (d) and the separating step (e) of the method can be carried out in one unit, thus saving equipment cost as well as maintenance cost. Further, by combining the three process steps, also reagent amounts can be reduced, e.g. the solvent.

In certain embodiments, reaction chamber (c) and/or reaction chamber (d) can also comprise a separator for separating at least a part of the suspended carbon containing reaction products. Examples of suitable separators that can be used as those separators as well as separator (e) include, but are not limited to filters, centrifuges, sedimentation tanks and other separation means for solid-liquid separating known to the skilled person.

In certain embodiments, the closed loop desulphurization and decarbonisation apparatus can further comprise an anodic oxidation stage to produce a peroxodisulfate salt from the dissolved OSCRPs provided in the separator (e). In preferred embodiments, the peroxodisulfate salt is precipitated in or after this stage for separation.

In certain embodiments, the closed loop desulphurization and decarbonisation apparatus can comprise means for recycling the regenerated EPM.

Furthermore, a power plant or a steel plant or a blast furnace or a waste burning plant comprising said desulphurization system or said closed loop desulphurization system is provided.

In the present method, apparatus and closed loop apparatus also halogens included in the flue gas can also be separated in certain embodiments by forming halogen salts of the electropositive metal. These salts then can be solid-liquid separated together with the CCRPs and/or OSCRPs and then be used for regeneration of the electropositive metal. This is particularly important when the present method, apparatus or closed loop apparatus is applied to a waste burning plant where higher amounts of halogens are produced, e.g. by burning polyvinyl chloride.

In preferred embodiments, the supplied electropositive metal EPM can be formed by lithium metal which reduces carbon dioxide in reducing step (b) after the reaction is started with an igniter in starting step (a) and yields various carbon containing materials. After a preferred hydrolysis in extracting step (c) lithium carbonate is precipitated. If lithium carbide is formed in reducing step (b) and extracted in water, acetylene can be formed. The produced lithium hydroxide produced in such a reaction between lithium carbide and water can then react with excess carbon dioxide transferred from reducing step (b) into the solvent to form lithium carbonate. In such an embodiment, the exit for acetylene has to be separate from a possible inlet for carbon dioxide. Also, $SO_x$ can be contained in the carbon dioxide as it does not affect the reaction. In such preferred embodiments, the lithium metal can also react with the sulphur oxides in the reducing step (b) which can then be hydrolyzed in extracting step (c). The sulfur containing reaction products of lithium metal can then, in preferred embodiments, be oxidized with oxygen or air comprising oxygen in oxidizing step (d) to produce dissolved lithium sulfate. Thus, in preferred embodiments, the dissolved lithium sulfate can be separated from the precipitated lithium carbonate. In such embodiments, the formed lithium sulfate can be further oxidized by anodic oxidation to lithium peroxodisulfate. The peroxodisulfate can in some embodiments than be precipitated with excess potassium chloride to from potassium peroxodisulfate. The formed lithium chloride and remaining potassium chloride can in some embodiments be then, in some embodiments after a precipitation by evaporation of the solvent, electrolyzed in a Down's process to regenerate lithium, which can be recycled to reducing step (b) in a continuous process. Further, in such embodiments, the formed and separated lithium carbonate can be reacted with aqueous hydrochloric acid to form lithium chloride. The lithium chloride can be electrolyzed to form lithium metal. This lithium metal can also be recycled to reducing step (b). The chlorine formed during the electrolysis can be used to produce aqueous hydrochloric acid, which then can be used again for reaction with lithium carbonate. In further embodiments, the lithium carbonate can be used as flux in other processes, as additive for cement and setting accelerator, as additive in glass ceramics, vitreous enamels, construction industry, aluminum electrolysis, fuel cells, molten carbonate fuel cells, etc.

In the exemplary embodiments the EPM used in starting step (a) and reducing step (b) of a method is lithium metal, and the solvent in extracting step (c) is water.

A first exemplary embodiment, shown in FIG. 1, shows a preferred method with four vessels for performing steps (a) to (e).

The reaction chamber 1 of the desulphurization and decarbonisation apparatus 100 is adapted to reduce the sulphur oxides $SO_x$ and the carbon dioxide $CO_2$ of the supplied flue gas FG in a highly exothermic reaction with lithium. The lithium metal EPM can be directly burned in the sulphur oxides $SO_x$ and carbon dioxide $CO_2$ of the supplied flue gas FG without a prior separation process. Before the introduction to reaction chamber 1, nitrogen oxides can be, but not necessarily are separated from the flue gas FG. In the reaction chamber 1, the exothermic reaction can be started using the burner with igniter 8.

In this embodiment, lithium can react with carbon dioxide in reducing step (b) to reduce it to valuable compounds, e.g. as follows:

$2Li+CO_2 \rightarrow Li_2O+CO-314.9$ kJ/mol(for comparison: $C+O_2 \rightarrow CO_2-393.5$ kJ/mol).

$4Li+CO_2 \rightarrow Li_2O+C-204.6$ kJ/mol.

$C+CO_2 \rightarrow 2CO+172.5$ kJ/mol; CO then could be converted to methanol, formic acid, etc.

$2C+2Li \rightarrow Li_2C_2$; $Li_2C_2$ could then be converted to acetylene.

$2CO_2+10Li \rightarrow Li_2C_2+4Li_2O$; $Li_2O$ absorbs excess $CO_2$.

$Li_2CO_3+4C \rightarrow Li_2C_2+3CO$.

$Li_2O+CO_2 \rightarrow Li_2CO_3 \rightarrow Li_2O+CO_2$ at the relevant temperatures around 1500°.

Heat of formation(298K):$Li_2O=-597.90$ kJ/mol; $Li_2CO_3=-1215.87$ kJ/mol.

After hydrolysis of these compounds in extracting step (c) in reaction chamber 2, a strongly alkaline $Li_2CO_3$ suspension can be obtained and supplied to the oxidizing step (d) in reaction chamber 3 and the separation step (e) in separator 4. Furthermore, the following reaction can occur during hydrolysis in reaction chamber 2:

$$Li_2C_2 + H_2O \rightarrow HC\equiv CH + 2LiOH.$$

The lithium hydroxide thus formed can be converted to lithium carbonate if an additional gas, such as flue gas, containing carbon dioxide is introduced in the extracting step (c). Also, excess carbon dioxide from reaction chamber 2 can be carried over into the solvent in reaction chamber 3 and dissolved therein so that the LiOH, which is also in an equilibrium state with $Li_2O$, reacts with carbon dioxide to form $Li_2CO_3$. If further carbon dioxide is added to react with LiOH still present, such addition should be carried out after separating acetylene.

Further, flue gas FG usually contains also oxygen, e.g. 3-4% $O_2$. The electropositive metal Li reacts with $O_2$ and the resulting $Li_2O$ reacts with $CO_2$ and forms $Li_2CO_3$.

Besides the reduction of carbon dioxide, the reduction of sulphur oxides takes also place in the combustion chamber 1 of the desulphurization system 100. With lithium Li, e.g. the following reactions can take place:

$$6Li + SO_2 \rightarrow Li_2S + 2Li_2O.$$

$$8Li + SO_3 \rightarrow Li_2S + Li_2O.$$

$$Li_2O + SO_2 \rightarrow Li_2SO_3 - 438.7 \text{ kJ/mol}.$$

Also, these reaction products can be hydrolyzed in extracting step (c) in reaction chamber 2.

Accordingly, a first suspension is generated in reaction chamber 2 during the extracting step (c) which comprises CCRPs such as $Li_2CO_3$ and also SCRPs and other products such as $Li_2S$, $Li_2SO_3$, $Li_2SO_5$, $Li_2S_2O_4$, $Li_2O$, LiOH, etc. as well as some $Li_2SO_4$. When LiOH and $Li_2O$ are formed due to the formation of lithiumcarbide in reducing step (b), it is preferred that those compounds are reacted with carbon dioxide in the first suspension to form lithium carbonate. Such a reaction with carbon dioxide takes place after the acetylene formed by the reaction of lithium carbide and water is separated. The carbon dioxide in this step can be added with $SO_x$ which does not influence the reaction. During the extracting step, the SCRPs of lithium all are highly soluble in water. For example, $Li_2S_2O_5$ or $Li_2SO_3$ are highly soluble in water. On the other hand, the predominantly produced CCRP lithium carbonate is only poorly soluble in water and thus leads to the formation of a suspension. The first suspension is submitted to forced oxidation in reaction chamber 3 in oxidizing step (d) by bubbling air or oxygen through the suspension, thus forming predominantly $Li_2SO_4$ as OSCRP, which is soluble at a rate of 350 g/l at room temperature in water and thus is dissolved in water in reaction chamber 3. Lithium carbonate, on the other hand, will not be further oxidized and forms solid particles in the suspension as CCRP.

The suspension is then transferred to separator 4. The separator 4 is adapted to separate the OSCRPs, e.g. $Li_2SO_4$, from the CCRPs, e.g. $Li_2CO_3$. By having a suspension in water, the sulphur containing reaction products of the suspension remain in solution, whereas the carbon containing reaction products, in particular $Li_2CO_3$, precipitate with a very low solubility rate of 13 g/l and can be filtered off as a pure product for recycling. Along the $Li_2CO_3$, also other sparingly soluble lithium salts like LiOH which contain no sulphur can precipitate in certain amounts. In the separator 4 the precipitated CCRPs, e.g. $Li_2CO_3$, are filtered from the OSCRPs which are still dissolved in the water. The separator 4 outputs an enriched solution which contains the dissolved lithium sulphur salts, predominantly lithium sulfate (hereinafter called lithium sulfate solution). In FIG. 1, reaction chamber 1, reaction chamber 2, reaction chamber 3 and separator 4 form the desulphurization and decarbonisation apparatus 100.

In some cases, at least some of the lithium carbonate or all the lithium carbonate can already be separated before or during the oxidizing step (d), so that the separator 4 is combined with reaction chamber 2 and/or reaction chamber 3.

The concentrated lithium sulfate solution can be refined by electrochemical means to make a regeneration of lithium possible, i.e. the sulfate has to be converted to a not readily soluble form. As shown in FIG. 1 the enriched lithium sulfate solution is supplied to an anodic oxidation stage 5 which produces a peroxodisulfate from the lithium sulfate solution provided by the separator 4. The anodic oxidation stage 5 forms highly soluble $Li_2S_2O_8$ which is supplied to a following precipitation stage 12. In the precipitation stage 12 the peroxide sulfate anions are precipitated by adding potassium chloride KCl in this exemplary embodiment to form potassium peroxide sulfate $K_2S_2O_8$ with a low dissolving rate of 50 g/l which precipitates, thus leaving a mixture of KCl/LiCl behind which can be used for the electrolytic production of lithium metal. In other embodiments, $NH_4Cl$ can be used in place of KCl.

As can be seen in FIG. 1 the KCl/LiCl mixture is supplied to a electrolysis unit 7 for electrolytic production of lithium metal wherein the formed lithium chloride and potassium chloride can undergo a Down's process for the electrochemical production of the lithium metal, which then can be recycled for reuse in the exothermic reaction with the flue gas FG in reaction chamber 1. The formed potassium peroxide sulfate $K_2S_2O_8$ can be used as a bleaching agent or as an etching agent, for instance as an etchant in the electronic industry.

Also the CCRPs separated by the separator 4 can be used for regeneration of the lithium. As can be seen in FIG. 1, the lithium carbonate $Li_2CO_3$ is supplied to a conversion unit 6 where the lithium carbonate is converted by means of aqueous hydrochloric acid into lithium chloride LiCl supplied to the electrolysis unit 7. Carbon dioxide, which is produced in this reaction, can also be reused or stored. Lithium chloride is converted in the electrolysis unit 7 by electrolysis into lithium metal which then can be recycled for reuse in the exothermic reaction with the flue gas FG in reaction chamber 1. The recycling steps from KCl/LiCl and $Li_2CO_3$ close the loop for the lithium metal.

As can be seen from FIG. 1 the anodic oxidation stage 5, the precipitation stage 12 as well as the electrolysis unit 7 form regeneration means adapted to regenerate the lithium, the EPM, from the separated OSCRPs. Further, the conversion unit 6 as well as the electrolysis stage 7 form regenerating means adapted to regenerate the EPM lithium from the separated CCRPs. The first regenerating means 6, 7 adapted to regenerate the electropositive metal EPM, i.e. lithium, from the separated CCRPs, and the second regenerating means 5, 12, 7 adapted to regenerate the electropositive metal EPM, i.e. lithium from the OSCRPs form a regeneration unit 200 which is adapted to regenerate the electropositive metal EPM lithium from the separated CCRPs as well as from the separated OSCRPs. As can be seen in FIG. 1, the desulphurization and decarbonisation system 100 and the regeneration unit 200 can form together a closed loop desulphurization and decarbonisation system 300 for performing an energy efficient desulphurization and carbon dioxide capture from the flue gas FG, wherein the used EPM lithium is also recycled by means of the regeneration unit 200. This closed loop desulphurization system 300 can be used for example in a power plant, a steel plant, a blast furnace or a waste burning plant.

Figure 2:
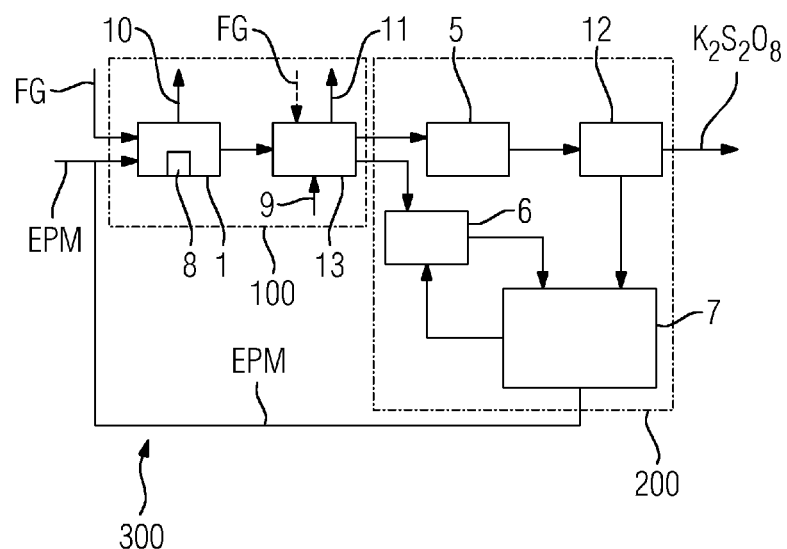
FIG. 2 shows a block diagram of a desulphurization and decarbonisation apparatus for energy efficient desulphurization of a flue gas comprising sulphur oxides and carbon dioxide according to another example of a possible embodiment.

FIG. 2 shows another embodiment. As can be seen in FIG. 2, in this embodiment the reaction chamber 2, the reaction chamber 3 and the separator 4 are replaced by a combined reactor 13. With this combined reactor, the extracting step (b), the oxidizing step (c) and the separating step (d) can be all carried out in one vessel. The further steps and components correspond to the steps and components in FIG. 1. It is, however, also possible to only combine two parts of the apparatus, i.e. reaction chamber 2 with separator 4 or reaction chamber 2 with reaction chamber 3 or reaction chamber 3 with separator 4, as described above.

In the above exemplary embodiments, the regenerated lithium metal Li can be transported for the exothermic reaction with the flue gas FG as a metal in solid form or as a liquid or as lithium hydride in solid form. Lithium has a low density and forms a very light material which is even lighter than water so that it can be easily transported. In a possible embodiment the regenerated lithium is transported as a metal in solid or liquid form. In an alternative embodiment the lithium is transported as lithium hydride in solid form. Furthermore, the lithium metal Li can be mechanically processed easily because it is relatively soft and can be cut with tools. Furthermore, lithium has the advantage that it has one of the lower melting points among all metals which facilitates the burning of lithium in the reaction chamber 1. In a preferred embodiment, the lithium is sprayed as a liquid into reaction chamber 1 and preheated prior to the spraying.

The method and system are not restricted to the use of lithium as an electropositive metal EPM but can use other electropositive metals EPM as well such as sodium, potassium, magnesium, calcium, strontium, barium, aluminum, zinc, or alloys thereof. Preferably used are lithium, magnesium, zinc, and alloys thereof, and lithium is particularly preferred.

With the present desulphurization and decarbonisation method, desulphurization and decarbonisation apparatus and closed loop desulphurization and decarbonisation apparatus, the following advantages can be obtained:

An apparatus is provided that not only produces thermal and electrical energy but also chemical starting materials which can be used for further chemical synthesis processes.

In an apparatus according to embodiments, an electropositive metal EPM, in particular lithium, and its resulting derivatives, can be used for carbon dioxide capture to produce solid carbonates, in particular $Li_2CO_3$, and for desulphurization to produce sulphur containing reaction products SCRPs, such as $Li_2SO_4$. The sulphur containing reaction products SCRPs are enriched as salt in solution, in particular as sulfate salt after the oxidation. The sulfate salt can be electrochemically converted to peroxodisulfate anions $Si_2O_8^{2-}$. The peroxodisulfate can be used as oxidant, e.g. for etching or bleaching, in the chemical industry. The carbon dioxide of the flue gas FG supplied to the reaction chamber (a) can be converted to some extent to carbon monoxide CO and acetylene. The generated carbon monoxide CO can be used as a basis for producing methanol, syngas, formic acid, etc., whereas acetylene can be used as a starting material for several fine chemicals such as 1,4-butanediol and vinyl acetate monomer. In the system, the $SO_x$ separation from the flue gas FG is not necessary since it can be converted by means of the electropositive metal EPM, particularly lithium, to useful products.

In the apparatus, the desulphurization and carbon dioxide capture can be accomplished in a single process sequence. The separation of the individual components/reaction products does not consume additional energy as in usual flue gas treatment processes. In particular the separation of the reaction products makes use of the fact that the oxidized sulphur containing reaction products SCRPs can be dissolved in a solvent, particularly water, whereas the carbon containing reaction products do precipitate, thus reducing the energy demand for the separation to a huge extent.

The system can be used in particular for burning natural gases with high sulphur content. In the reaction chamber (b), a strong exothermic reaction takes place which liberates thermal energy which can exceed 500° C., preferably 1500° C. and can, for example, power a steam turbine to generate electricity. Alternatively, the energy produced in this reaction can be converted by a heat exchanger. This on-site thermal energy can be used to produce electricity, but also to power on-site thermal energy intensive processes. The generated heat or steam can also be used for other industrial processes, district heating or other applications. A further advantage lies in the use of an EPM in the method, which can be produced from renewable energy sources, thus further limiting the energy used in the present method on site. Although the present reducing step (b) in the present method as well as the whole method can in principal also be carried out with hydrogen, the use of the EPM provides the advantage that it can be easy transported, easily generated and does not require expensive equipment, e.g. to prevent explosions or to handle high pressure.

Furthermore, sulphur containing flue gas can generally be fully recycled and cleaned without using any additional carbon based energy for the removal of the sulphur oxide. In the closed loop desulphurization and decarbonisation apparatus, further the EPM can be recycled, thus limiting the need for further EPM and thus saving additional expenses as well as waste. As the EPM can be produced from renewable energy sources, the present method can be used to convert flue gas into valuable products without excessive use of energy on site and rather even can produce energy during the flue gas treatment.

The invention claimed is:

1. A desulphurization and decarbonisation apparatus, comprising:
   (a) at least one starter for starting a reaction between an electropositive metal and sulphur oxides and carbon dioxide of a flue gas;
   (b) a first reaction chamber comprising cooling means for reducing the sulphur oxides and the carbon dioxide of said flue gas in an exothermic reaction with the electropositive metal;
   (c) a second reaction chamber for generating a first suspension comprising suspended carbon containing reaction products and sulphur containing reaction products by extracting solid reaction products of the first reaction chamber in a solvent;
   (d) a third reaction chamber for oxidizing the first suspension to generate a second suspension comprising suspended carbon containing reaction products and oxidized sulphur containing reaction products; and
   (e) at least one separator for separating the oxidized sulphur containing reaction products from the suspended carbon containing reaction products.

2. The desulphurization and decarbonisation apparatus as claimed in claim 1, wherein the first reaction chamber (b) comprises a burner.

3. The desulphurization and decarbonisation apparatus as claimed in claim 1, wherein
   the second reaction chamber (c) and the third reaction chamber (d), or the second reaction chamber (c) and the at least one separator (e), or the third reaction chamber (d) and the at least one separator (e), or the second reaction chamber (c), the third reaction chamber (d) and the at least one separator (e) are combined in one unit.

4. The desulphurization and decarbonisation apparatus as claimed in claim 1, further comprising:

an anodic oxidation stage to produce a peroxodisulfate salt from dissolved oxidized sulphur containing reaction products provided by the at least one separator (d).

5. The desulphurization and decarbonisation apparatus as claimed in claim 1, further comprising:

first regenerating means for regenerating the electropositive metal from the separated suspended carbon containing reaction products, and/or second regenerating means for regenerating the electropositive metal from the separated oxidized sulphur containing reaction products.

6. The desulphurization and decarbonisation apparatus as claimed in claim 1, wherein the third reaction chamber (d) comprises a means for bubbling air or oxygen.

7. The desulphurization and decarbonisation apparatus as claimed in claim 1, wherein the first reaction chamber (b) and/or the second reaction chamber (c) and/or the third reaction chamber (d) comprise(s) an exit for gaseous products.

8. A closed loop desulphurization and decarbonisation apparatus, comprising:

(a) at least one starter for starting a reaction between an electropositive metal and sulphur oxides and carbon dioxide of a flue gas;

(b) a first reaction chamber comprising cooling means for reducing the sulphur oxides and the carbon dioxide of said flue gas in an exothermic reaction with the electropositive metal;

(c) a second reaction chamber for generating a first suspension comprising suspended carbon containing reaction products and sulphur containing reaction products by extracting solid reaction products of the first reaction chamber in a solvent;

(d) a third reaction chamber for oxidizing the first suspension to generate a second suspension comprising suspended carbon containing reaction products and oxidized sulphur containing reaction products;

(e) at least one separator for separating the oxidized sulphur containing reaction products from the suspended carbon containing reaction products; and (f) at least one regeneration unit for regenerating the electropositive metal from the separated suspended carbon containing reaction products and/or from the separated oxidized sulphur containing reaction products.

* * * * *